(12) United States Patent
Brewster

(10) Patent No.: US 7,114,898 B2
(45) Date of Patent: Oct. 3, 2006

(54) LATCH DEVICE FOR SECURING CARGO CONTAINERS TOGETHER AND/OR TO VEHICLE DECKS

(75) Inventor: John B. Brewster, Homewood, IL (US)

(73) Assignee: Holland L.P., Crete, IL (US), 1

( * ) Notice: Subject to any disclaimer, the term of this patent is extended or adjusted under 35 U.S.C. 154(b) by 77 days.

(21) Appl. No.: 10/415,394

(22) PCT Filed: Nov. 2, 2001

(86) PCT No.: PCT/US01/46118

§ 371 (c)(1),
(2), (4) Date: May 14, 2004

(87) PCT Pub. No.: WO02/36908

PCT Pub. Date: May 10, 2002

(65) Prior Publication Data

US 2005/0258330 A1 Nov. 24, 2005

Related U.S. Application Data

(60) Provisional application No. 60/292,505, filed on May 21, 2001, provisional application No. 60/245,962, filed on Nov. 3, 2000.

(51) Int. Cl.
*B60P 7/08* (2006.01)

(52) U.S. Cl. .............................. 410/70; 410/69; 410/76; 410/80

(58) Field of Classification Search ............ 410/69–70, 410/76, 80; 248/503.681; 292/109, 121
See application file for complete search history.

(56) References Cited

U.S. PATENT DOCUMENTS 5,570,981 A * 11/1996 Brewster ..................... 410/70
5,613,814 A * 3/1997 Jackson ....................... 410/70

* cited by examiner

*Primary Examiner*—Stephen Gordon
(74) *Attorney, Agent, or Firm*—David C. Brezina; Barnes & Thornburg LLP

(57) ABSTRACT

A cargo container hold down device that includes a housing defined by a base which forms a planar surfacing thereabout on which cargo container corner fittings results in the applied relation on the container relative to the supporting structure or platform involved. The hold down device includes a flanged end which engages a cargo container corner casting aperture opening or an appropriate aperture and utilizes the structure for retention of the hold down device so the opposite side of the hold down device is allowed to automatically engage and disengage with a cargo container corner fitting as necessary to achieve proper handling and transport of cargo containers.

3 Claims, 15 Drawing Sheets

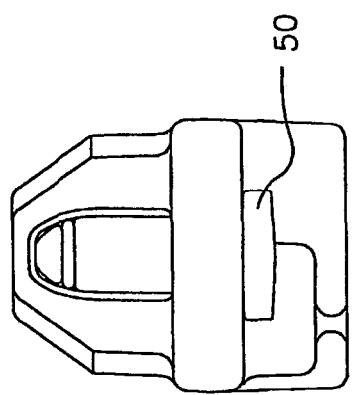
Figure 9
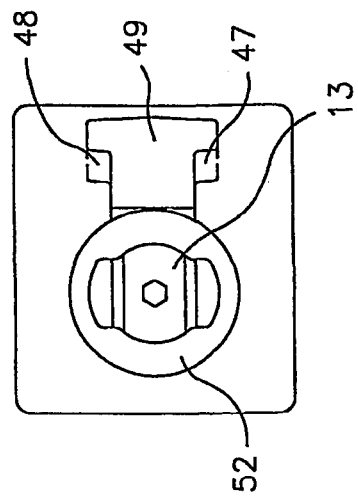
Figure 10
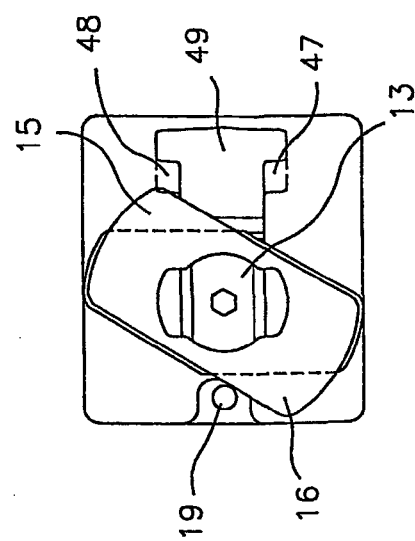
Figure 11
Figure 12

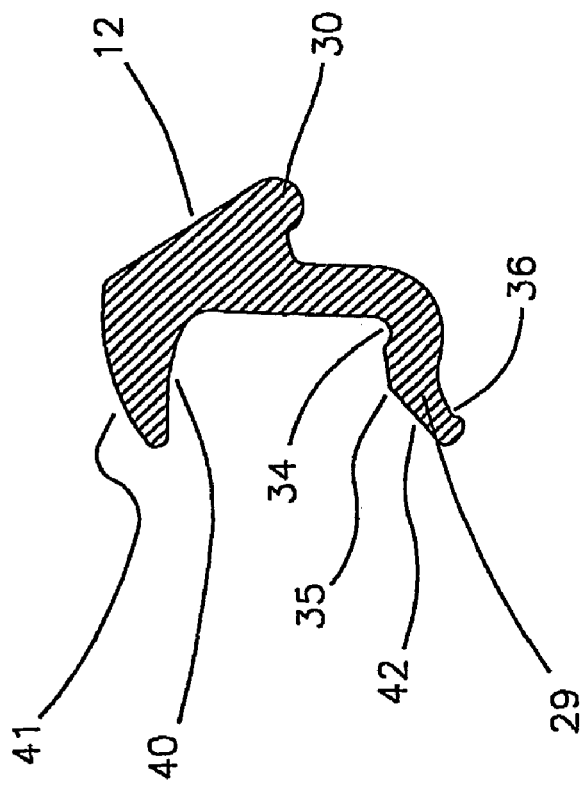
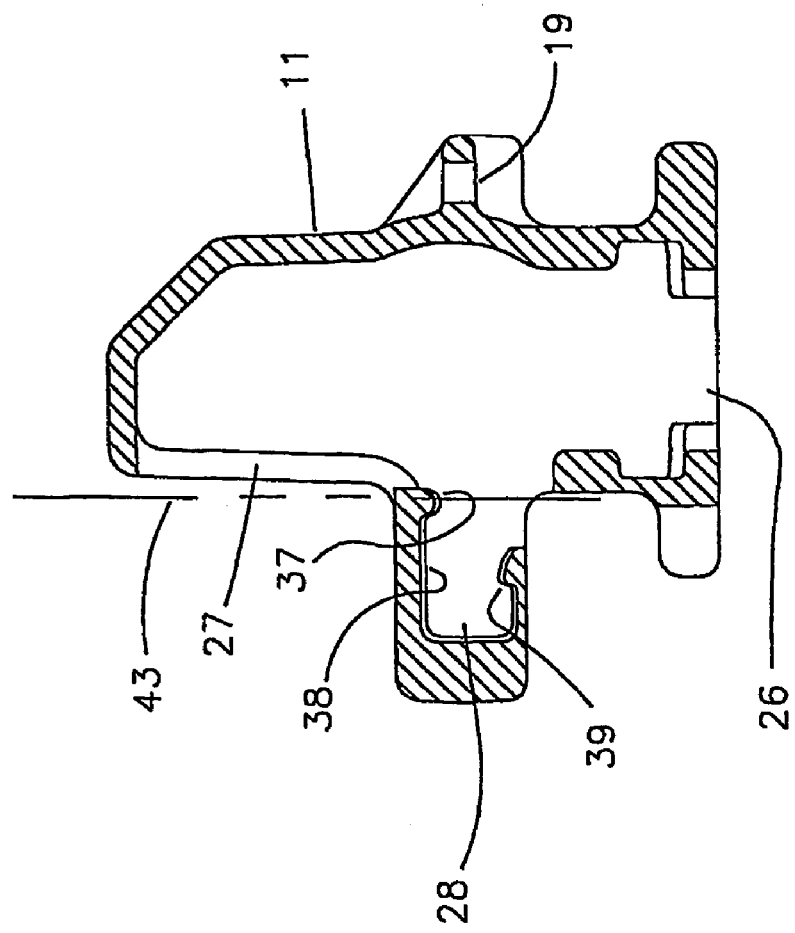
Figure 14
Figure 13

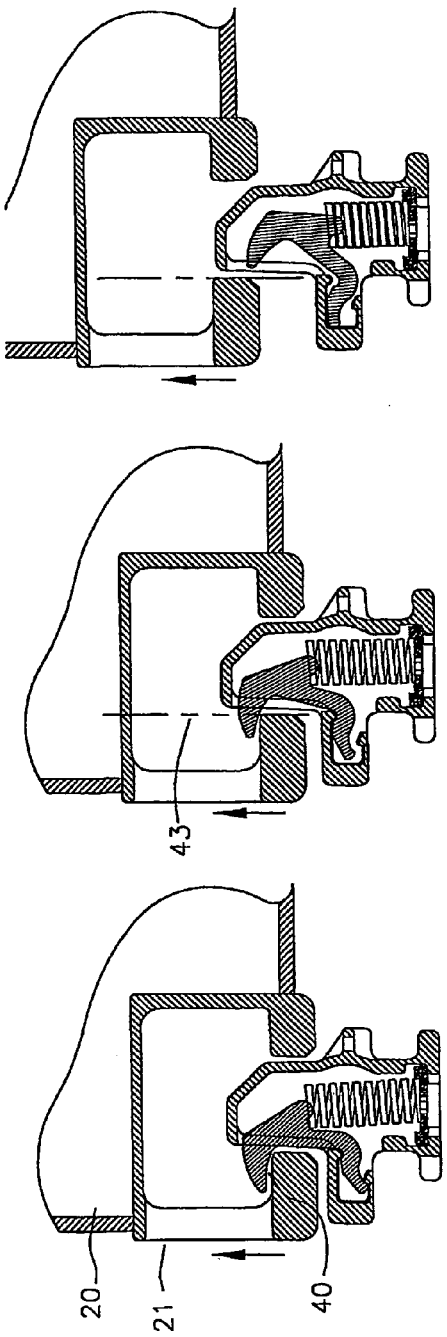
Figure 23
Figure 24
Figure 25
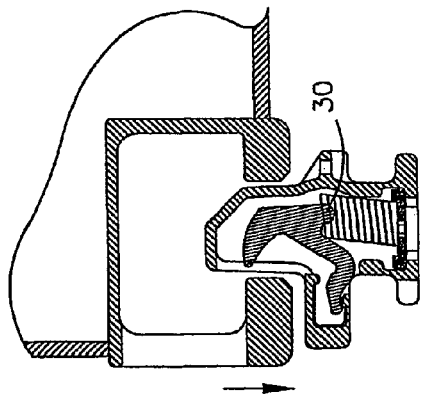
Figure 27
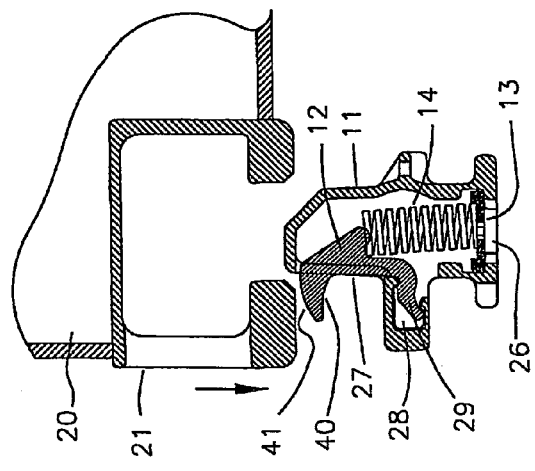
Figure 26

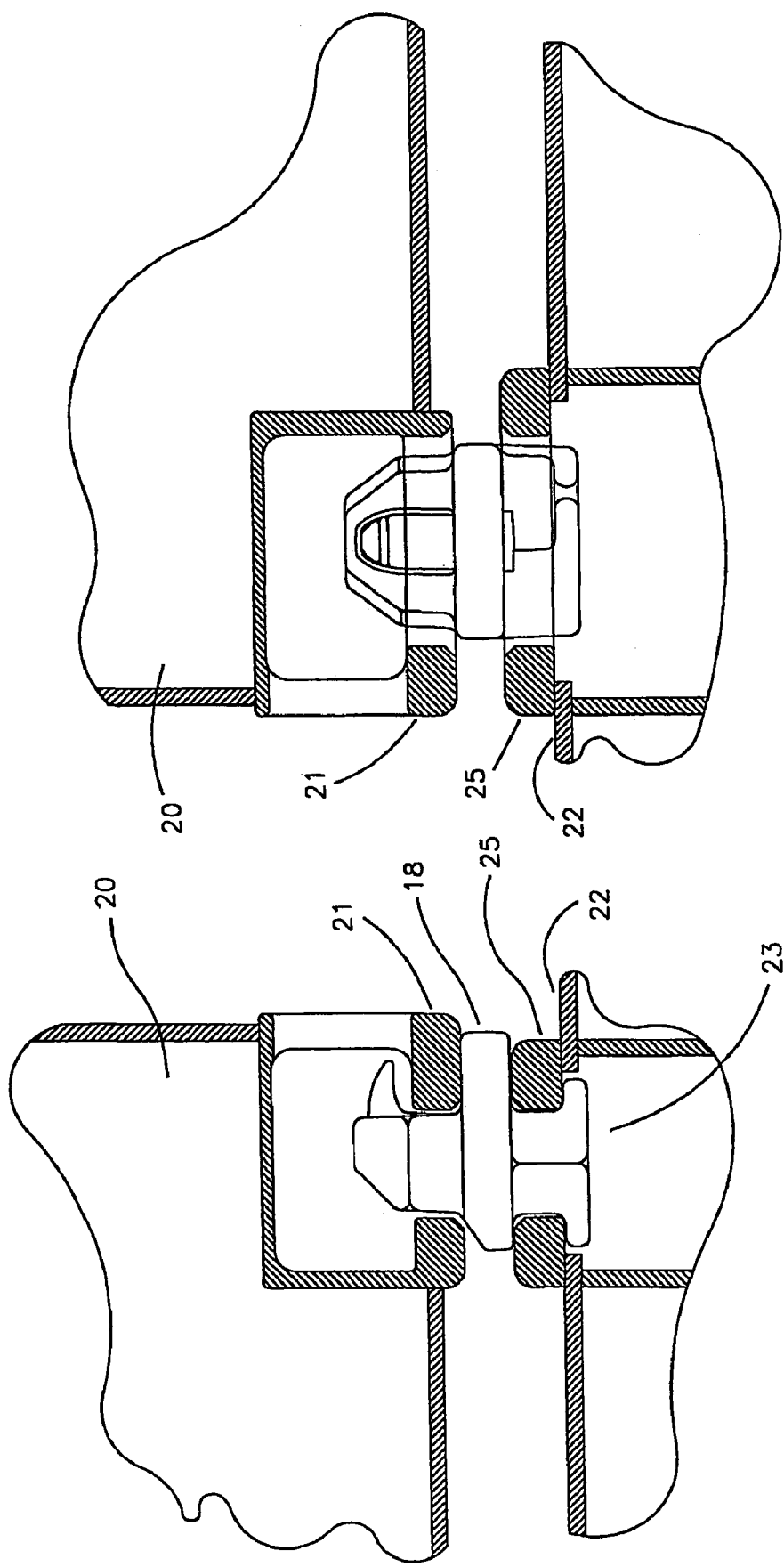

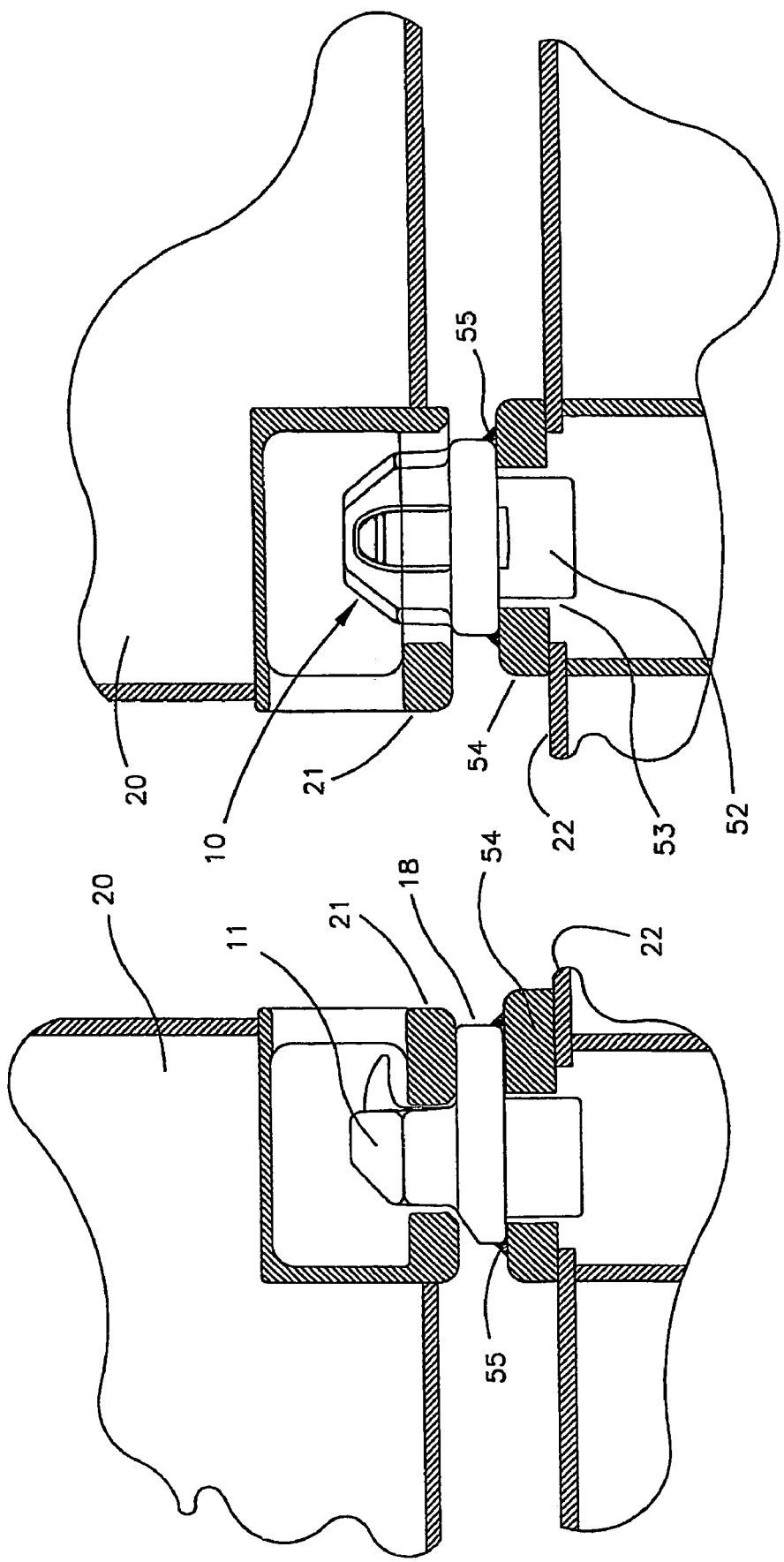

LATCH DEVICE FOR SECURING CARGO CONTAINERS TOGETHER AND/OR TO VEHICLE DECKS

CLAIM OF PRIORITY

This is a non-provisional application claiming priority based on App. No. 60/245,962, filed Nov. 3, 2000 and entitled "Latch Device for Securing Cargo Containers Together And/or to Vehicle Decks," and also claiming priority based on App. No. 60/292,505, filed May 21, 2001 also entitled "Latch Device for Securing Cargo Containers Together And/or to Vehicle Decks."

BACKGROUND OF THE INVENTION

The invention relates to container securement devices, and more particularly, to improvements in cargo container securement devices of the type that provides automatic securement and release of a cargo container. The device is mountable and demountable on a deck or frame of a vehicle so that the device can be adapted to different load conditions including a different mix of containers of different length and the like while having unused devices not interfere with the flush mounting of long containers.

DESCRIPTION OF RELATED ART

U.S. Pat. No. 3,365,229 teaches a top coupler means for interlocking a pair of opposed container corner brackets to provide for a tandem coupling of said containers, said top coupling means including a pair of first and second severable top coupler elements, each element having a clamp portion for engagement with respective corner bracket and a spacer portion engageable with the spacer portion of the other element attendant to space separation of one corner bracket from the other, said first top coupler element being provided with one coupler element interlock portion and said second top coupler element being provided with another coupler interlock portion for intercoupling with the one interlock portion, and means for pivotally interlocking one element with the other, and bottom coupling means for coupling the bottoms of the containers together, and hoisting means therefore. The disclosure in this patent is incorporated by reference in the instant application as if fully set forth herein.

U.S. Pat. No. 3,603,267 teaches a supporting and securement structure adapted to use on carrier vehicles, including railway flatcars, for the transportation of varied sizes and numbers of box-type containers in which merchandise is shipped; said structure having guide tracks secured to the carrier vehicle structure and one-piece pedestal type supports with integral support portions retained within the guide tracks for movement therealong to predetermined positions of securement and swingable around said support portions between upright and collapsed positions, the support pedestals being constructed and propelled for relative stability in their upright positions and collapsible into relatively small openings in the guide tracks themselves to close said openings when not in use. The disclosure in this patent is incorporated by reference in the instant application as if fully set forth herein.

U.S. Pat. No. 3,604,363 teaches spring-biased latches on a transport carrier for automatically engaging and disengaging bottom corner container fittings are bodily movable to maintain the same latching engagement within limits for various clearances between the container fittings and the housings secured to the transport carrier on which the latches are mounted. The disclosure in this patent is incorporated by reference in the instant application as if fully set forth herein.

U.S. Pat. No. 3,604,364 teaches fittings at the corners of a container that are automatically latched to a railway car when it is lowered thereon and unlatched therefrom when the container is lifted from transport position. Each fitting is received in a housing on the car on which a bellcrank latch is mounted to pivot about a pair of spaced axes under the biasing action of a coil compression spring reacting between the housing and the distal end of one arm of the latch. The distal end of the other arm of the latch has latching engagement with the respective container fitting. The housings are slidable along slots extending lengthwise along opposite sides of the car and can be swung to retracted positions on trunnions extending below the floor or deck of the car. The trunnions are located in spaced relation to the latches to cause them to maintain latching engagement with the container on upward movement of it during transport. The retracted housings are arranged to be bypassed by other housings slidable along the slots. The disclosure in this patent is incorporated by reference in the instant application as if fully set forth herein.

U.S. Pat. No. 3,628,222 teaches a latching mechanism having two pivotally mounted and interacting members. This mechanism provides for automatic locking when moved to the latched position with provisions for unlocking when unlatching is desired. The latching mechanism is particularly adaptable for use in latching shipping containers to the bed of transporting vehicles. The disclosure in this patent is incorporated by reference in the instant application as if fully set forth herein.

U.S. Pat. No. 3,630,155 teaches a railroad car container bracket mounted on transverse sideplate means attached periodically to the sides of the railroad car deck. The bracket is pivoted on an axis transverse to the longitudinal centerline of the car and constructed in such a manner as to prevent longitudinal, transverse, and vertical movement of a container. When the brackets are in position supporting the four bottom corners of a container, the bracket will transmit impact forces to the deck of the railway car in a unique manner which shields the bracket pivot pin from damaging shearing forces. The bracket also contains a spring-loaded pivot latch which prevents dislodgment of the container in a vertical direction, especially when the container is empty and subjected to high wind loading which tends to tip an empty container from the deck of the container car. The disclosure in this patent is incorporated by reference in the instant application as if fully set forth herein.

U.S. Pat. No. 3,774,551 teaches a spring biased latch lever is variably pivoted on the housing of container securing means on a transport carrier to accommodate minimum and maximum clearances between the container securing means and the bottom container fitting mounted thereon. The disclosure in this patent is incorporated by reference in the instant application as if fully set forth herein.

U.S. Pat. No. 4,236,853 teaches a coating of cadmium applied to a container pedestal latch protuberance which lowers the maximum exit force sufficiently as to be within the 2200 pound maximum in the AAR specification while the minimum exit force of 1600 pounds and the maximum container entry force of 800 pounds were also within the specification. The disclosure in this patent is incorporated by reference in the instant application as if fully set forth herein.

U.S. Pat. No. 4,277,212 teaches a connector for use in the securement of a first member, such as a cargo container, to a base support includes a base member, a post member extending from the base member in one direction and an attaching means for attaching the connector to the base support extending from the base member in the other direction. Restraining means provides vertical restraint to the container when the post member is positioned to extend into the opening of the web of the corner casting thereof and the container is restrained from movement in at least one horizontal direction. In one form, a restraining surface for the container is located on a cam pivotally mounted by the post member and in a second form, a restraining surface for the container is on the post member itself. The cam of the first form is pivotally mounted so that in response to lifting movement, the cam is rotated about its axis to act upon the web portion to impact a force horizontally whereby the container, in loading, follows a path similar to that in loading. In the second form, a plunger, under a force of compression of a spring, acts on the web portion to provide a similar function. The disclosure in this patent is incorporated by reference in the instant application as if fully set forth herein.

U.S. Pat. No. 4,372,715 teaches a punch type release lock intended for use primarily in retaining load supports such as pallets in locked position in an aircraft. The lock comprises a detent mechanism which is inserted into a recess preferably at the side of the load support. A preferred form of detent mechanism comprises a pair of relatively movable elements, at least one of which is pivoted. The elements include abutments which are movable apart as the elements are inserted into the recess. When a load is applied to the pivoted detent, as for example, by a parachute extracting system, movement of the element in a direction to withdraw the element to release the load support is prevented by a load cell comprising a fuse plate and punch, in which the punch is prevented from movement by the fuse plate until attainment of a predetermined load on the pivoted detent element. At the pre determined load, the punch penetrates the fuse plate and upon penetration of the fuse plate, the punch is relatively freely movable to effectively permit the load support to move the pivoted detent element to completely release the load support. The disclosure in this patent is incorporated by reference in the instant application as if fully set forth herein.

U.S. Pat. No. 4,382,734 teaches a container pedestal for supporting and securing a cargo container having a catch opening on a vehicle such as a rail car. The pedestal includes a base defining a platform for supporting the container. A pivotal latch lever is biased by a spring into a latched position wherein a latching nose on the lever registers with a latch recess in the container. The latch nose is contacted for pivoting the latch lever from the latched to a released position when the container is raised or lowered. The latch lever can be manually locked, yet self-entry automatic loading can be carried out in the locked condition. A line contact between the latch lever and the spring provides reliable and consistent latch operation due to a uniform spring lever arm length. The disclosure in this patent is incorporated by reference in the instant application as if fully set forth herein.

U.S. Pat. No. 4,382,735 teaches a container pedestal for supporting and securing a cargo container having a catch opening on a vehicle such as a rail car. The pedestal includes a base defining a platform for supporting the container. A pivotal latch lever is biased by a spring into a latched position wherein a latching nose on the lever registers with a latch recess in the container. The latch nose is contacted by the container for pivoting the latch lever from the latched to a released position when the container is raised or lowered. The latch lever can be manually locked, yet self-entry automatic loading can be carried out in the locked condition. A line contact between the latch lever and the spring provides reliable and consistent latch operation due to a uniform spring lever arm length. The disclosure in this patent is incorporated by reference in the instant application as if fully set forth herein.

U.S. Pat. No. 4,430,032 teaches a latch for locking a container to a pedestal on the flat deck of a flat car and particularly containers containing flammable materials. The container is supported on a pedestal at each corner thereof and the pedestals are adjustably mounted in guideways for movement along the deck of the flat car in accordance with the length of the container, to support containers at selected intervals along the car. A spring biased latch is provided to lock the container to the pedestal and a lock is provided for the latch is provided which reacts against the pedestal and includes a biasing spring for the lock to positively hold the latch in a locked position even though the car should be derailed. The disclosure in this patent is incorporated by reference in the instant application as if fully set forth herein.

U.S. Pat. No. 4,626,155 teaches a device for automatically securing a cargo container to a support such as a deck of a vehicle or a second container with the first container is to be stacked. The device includes a base having a projecting shear block received in the locking opening of the container. A head rotates between an unlocked or loading position in which the head moves through the locking opening and a locked position in which the container is secured. Automatic entry and release are provided by a spring within the biasing the head to the locked position but permitting movement to the unlocked position when torque is applied by engagement of the container with a cam surface on the head. Visible indication of the locked position and positive locking of the head in the locked position may be provided. For stacked containers, two aligned shear blocks and two angularly offset heads are provided and the spring may be released for manual locking of the device to one container followed by automatic locking to the second container. The disclosure in this patent is incorporated by reference in the instant application as if filly set forth herein.

U.S. Pat. No. 5,090,638 teaches a locking mechanism for tying down a piece of freight on a loading floor in an aircraft has a housing recessed in the loading floor. A latch opening member and a latching member are journalled in the housing to tilt toward each other or away from each other. Follower cams of the latching member ride in respective cam guide tracks of the latch operating member. A tension spring tends to bias the latching member and the latch operating member in opposite directions in a freight latching position or into a recessed beyond dead center position. Stop members are so positioned on the latch operating member and on the latching member that the latter cannot be tilted without activating the latch operating member which can be rolled over by a piece of freight in one direction when projecting from the housing and in the other direction when recessed into the housing. The disclosure in this patent is incorporated by reference in the instant application as if fully set forth herein.

U.S. Pat. No. 5,106,247 teaches an automatic hold down and locking as well as automatic load configuration change capability device system, which can be used to hold down and lock either one long container or several shorter containers within the same loading space, regardless of the outside width or width of bottom side rail flange on the container. The locking device system has four fixed non-retractable fully automatic locking devices positioned on the load carrier at the four outer standard locking points of each long container, and at least two retractable fully automatic locking devices positioned at the long side of the load carrier between and in line with the outer locking points. The disclosure in this patent is incorporated by reference in the instant application as if fully set forth herein.

U.S. Pat. No. 5,560,088 teaches a coupling piece includes an abutment and locking member which is shiftable relative to the abutment to allow for an automatic and reliable locking of the containers. The coupling pieces do not jam when the connection is released by means of slightly tilting the upper container. The coupling piece is particularly suitable for automatically locking and releasing tightly stowed containers, especially 20' containers. In an alternate embodiment, a coupling piece is shaped such that the entire coupling piece is shifted to a locking position when containers are placed on top of one another. The disclosure in this patent is incorporated by reference in the instant application as if fully set forth herein.

U.S. Pat. No. 5,570,981 teaches a cargo container hold down device that includes a shear block defining a base and a housing therefore that is shaped so that the base forms a planar surfacing thereabout on which the cargo container fitting rests in the applied relation of the container relative to the supporting platform involved; the shear block housing pivotally mounts a latch device comprising a latch member that includes a nose portion having an upper cam surfacing for engagement by a correspondingly located container mounted corner fitting, and an under cam surfacing disposed for engagement by such correspondingly located container mounted corner fitting on removal of such container therefrom, the latch member being biased outwardly of the shear block housing to dispose the nose thereof over the container corner fitting supporting surface of the shear block housing, and including an element for withdrawing such latch member within the shear block housing about one pivot axis when the container is applied to the device, and an element for withdrawing such latch member within the shear block housing about a separate axis that is spaced from and parallels the first indicated pivot axis when the container is removed from such device, so as to achieve a smooth and easier loading of the container, and provide for increased force for cam positioning of the device latch member for container removal purposes. The disclosure in this patent is incorporated by reference in the instant application as if fully set forth herein.

U.S. Pat. No. 5,797,169 teaches a coupling piece for the detachable connection of corner fittings of adjacent containers, especially of containers stacked one above the other on board ships. In order to reduce the manual effort involved in coupling together containers, semi-automatic coupling pieces are known which only need to be manually attached to one container and pre-locked. A full locking after the containers have been placed one on top of the other is effected automatically. Coupling pieces of this type require however, in many respects, a complex automatic actuating mechanism. In order to simplify the automatic actuating mechanism, a plurality of stop faces are provided, which are offset to one another on the locking bolt and which can be brought alternately into a corresponding position to a stop face on a spring-loaded ram. The contact of a stop face of the locking bolt against the stop face of the spring-loaded ram enables the locking bolt to be fixed simply and reliably in the respectively intended position of its crossbolts. The disclosure in this patent is incorporated by reference in the instant application as if fully set forth herein.

Canadian Patent No. 589031, issued December, 1959, in Class/Subclass 410/80 is believed to generally relate to the subject matter of this invention.

A company known as Peck & Hale has offered for sale a model F665 Safe-T-Loc Stacker container lock, believed to be more than one year prior to the filing date of this application.

It will be seen that the forgoing prior art teaches certain parameters for container locks and use various complex solutions to meet the needs taught. The instant invention departs from the complex mechanisms and mechanisms of limited functionality in its use of the housing with several camming surfaces, a latch with specific geometry to engage the surfaces in the housing, the corner casting of the container and the spring, moving through the required motion and imparting the required loads and resistance to forces, yet further providing a simple, strong and efficient structure with a minimum of parts, notably without a latch pivot. Additionally, the prior art typically uses either complex spring mounting and seating arrangements or spring mounting and/or seating arrangements that are difficult to work with, particularly when changing broken springs or replacing springs with appropriately calibrated springs. The instant invention utilizes simple, yet high performance spring mounting and seating.

BRIEF DESCRIPTION OF THE PREFERRED EMBODIMENT

A device for securing cargo containers to a vehicle deck and/or two cargo containers together comprising a housing containing a latch mechanism that extends outwardly from the housing to engage a cargo container corner casting. The other side of the housing has two flanges projecting therefrom in a generally "T" shaped plan form.

In the case where two cargo containers are to be secured together, the flanges are inserted into the aperture of a cargo containers corner fitting manually and oriented in such a manner as to prevent its removal. The appropriate corner fitting of the other cargo container is brought into contact with the exposed end of the device's latch mechanism that extends outwardly from the housing to engage the cargo container corner casting and secure the two cargo containers together. When appropriate force is exerted to pull the two cargo containers apart, the devices latch mechanism that extends outwardly from the housing will automatically retract into the devices housing allowing the two cargo containers to be separated.

In the case where a cargo container is to be secured to a deck or frame of a vehicle, the flanges are inserted into the aperture of a deck or frame of a vehicle manually and oriented in such a manner as to prevent its removal. The appropriate corner fitting of the cargo container is brought into contact with the exposed end of the device latch mechanism that extends outwardly from the housing to engage the cargo container corner casting and secure it to the deck or frame of a vehicle. When appropriate force is exerted to pull the cargo container off of the deck, the devices latch mechanism that extends outwardly from the housing will automatically retract into the devices housing allowing the cargo container to be removed.

BRIEF DESCRIPTION OF THE DRAWINGS

FIG. 9 is a side elevational view of the latch device for cargo containers, same as FIG. 4.

FIG. 10 is an alternate frontal elevational view other than FIG. 5 of the latch device for cargo containers showing a frontal cavity which is utilized during assembly of the alternate latch that contains two stub protrusions on the end of the leg of the latch.

FIG. 11 is an alternate bottom plan view other than FIG. 8 of the latch device for cargo containers showing a bottom cavity which is utilized during assembly of the alternate latch that contains two stub protrusions on the end of the leg of the latch.

FIG. 12 is an alternate bottom plan view other than FIGS. 8 and 11 of the latch device for cargo containers showing an alternate bottom housing shape which maybe utilized when the said latch device is being applied to a support surface that does not require the housings bottom flanges, such as in the case of welding the housing to a support surface.

FIG. 13 is a sectional side elevational view of the housing for the latch device.

FIG. 14 is a sectional side elevational view of the latch for the latch device.

FIG. 23 is a sectional side elevational view showing the positions of the latch devices internal components just prior to the cargo containers corner fitting being removed from the device.

FIG. 24 is a sectional side elevational view showing the positions of the latch devices internal components during partial removal of the cargo containers corner fitting from the device.

FIG. 25 is a sectional side elevational view showing the positions of the latch devices internal components retracted into the devices housing just after the cargo containers corner fitting has been removed from the device.

FIG. 26 is a sectional side elevational view showing the positions of the latch devices internal components just prior to the cargo containers corner fitting engaging with the device.

FIG. 27 is a sectional side elevational view showing the positions of the latch devices internal components fully retracted into the devices housing just after the cargo containers corner fitting has been engaged onto the device.

FIG. 41 is a lateral side elevational view of the latch device appropriately retained between a cargo container on the top and an appropriate vehicle deck on the bottom.

FIG. 42 is a longitudinal side elevational view of the latch device appropriately retained between a cargo container on the top and an appropriate vehicle deck on the bottom.

FIG. 43 is a lateral side elevational view of the latch device appropriately retained between a cargo container on the top and an appropriate vehicle deck on the bottom, said device represents being welded to the vehicle deck.

FIG. 44 is a longitudinal side elevational view of the latch device appropriately retained between a cargo container on the top and an appropriate vehicle deck on the bottom, said device represents being welded to the vehicle deck.

DETAILED DESCRIPTION OF THE PREFERRED EMBODIMENT

Figure 1:
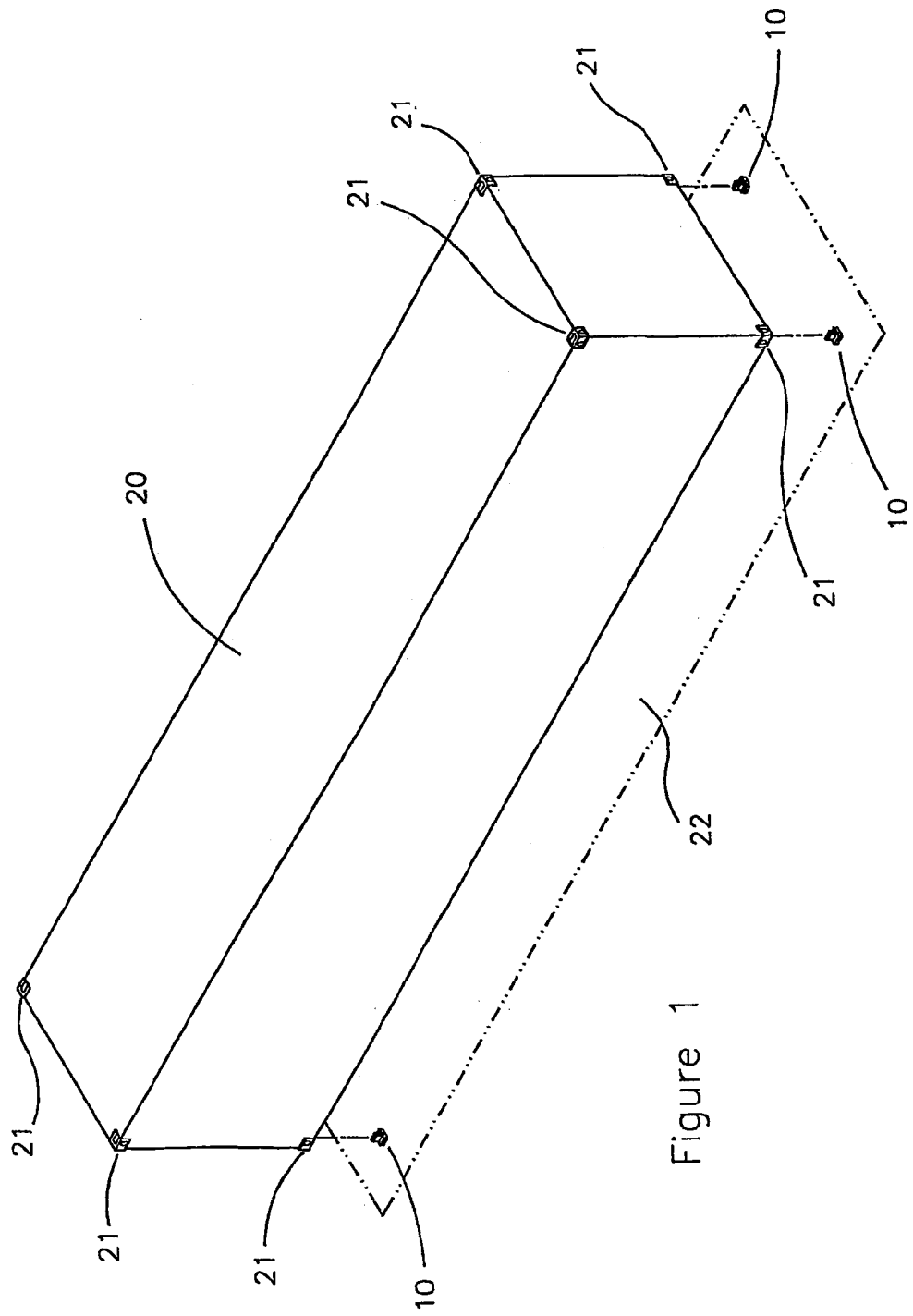
FIG. 1 is a largely schematic perspective view of a support surface to which the indicated pairs of container support or hold down devices have been applied, and a cargo container is to be supported thereon, which support surface may be, for instance, the deck of a railroad car.
Figure 3:
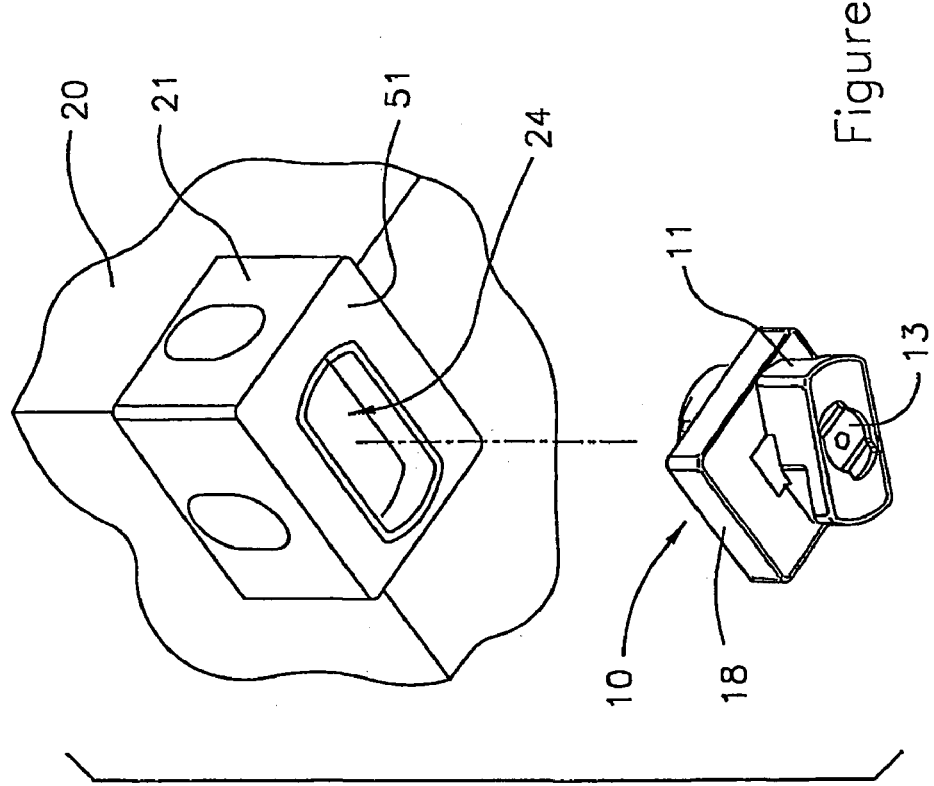
FIG. 3 is a diagrammatic perspective view showing the container lock or securement device of FIG. 2 assembled and disposed to receive the conventional lower corner fitting of a cargo container that is being lowered onto same; the securement device of FIG. 3 is shown deliberately separated from, for instance, a railroad car deck, that normally supports same, to expose the underside of same for disclosure purposes.

Referring now to FIG. 1, there is illustrated in somewhat of a diagrammatic manner a support 22 upon which a cargo container 20 is to be secured by Applicant's improved securement devices 10 that, in this regard, are arranged in accordance with FIGS. 2 through 44 of this application, and in accordance with the principles of the present invention herein disclosed. The support 22 may, for instance, be a deck or floor of a railroad flat car or other rail transport vehicle, or support 22 may be another type of vehicle to which the device 10 is applied in multiples of four for the usual application thereof to cargo container corner fittings 21 or the like.

The principles of the present invention are applicable to devices for securing various types of containers to various types of supports. In the illustrated embodiment of the invention, the cargo containers 20 are identical and are of the usual parallelepiped configuration that is involved in standard and modular forms of containers of this type as illustrated, each of the four lower corners of each container 20 includes a corner fitting 21 in the nature of a corner casting that may be of the type specified by the standards of the Association of American Railroads. The corner fitting 21 defines an upwardly or downwardly facing horizontal wall 51 (see FIG. 3) that defines an opening 24 that is of the familiar quadrilateral configuration. In accordance with the present invention, the securement devices 10 are intended to protrude through the locking opening 24 of the individual container corner fittings to achieve securement and automatic entry and release of the respective containers as hereinafter disclosed.

The lock or securement device 10 of the present invention is illustrated in detail in FIGS. 2 through 44, which will be described in detail hereinafter.

Figure 2:
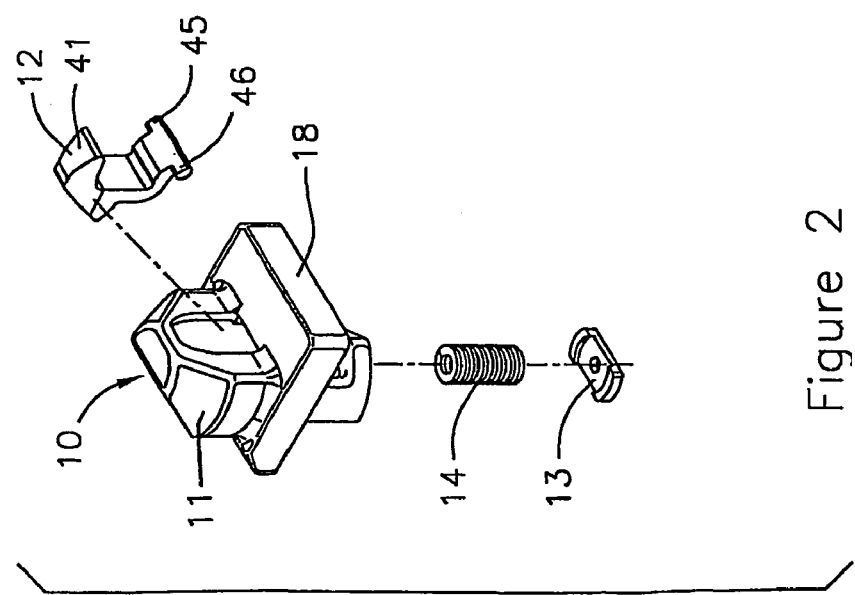
FIG. 2 is an exploded perspective view of one of the cargo container lock or securement devices arranged in accordance with the invention.
Figure 5:
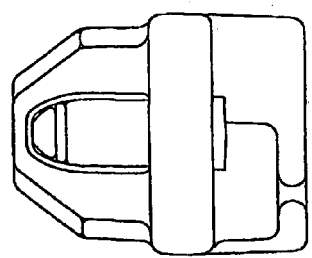
FIG. 5 is a frontal elevational view of the latch device for cargo containers.
Figure 7:
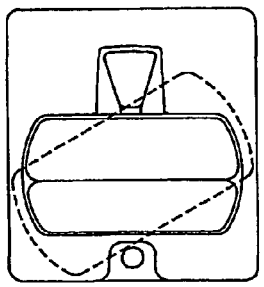
FIG. 7 is a top plan view of the latch device for cargo containers.
Figure 4:
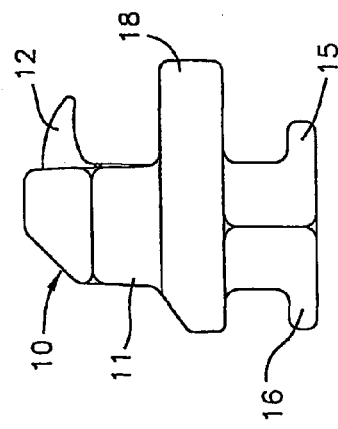
FIG. 4 is a side elevational view of the latch device for cargo containers.
Figure 8:
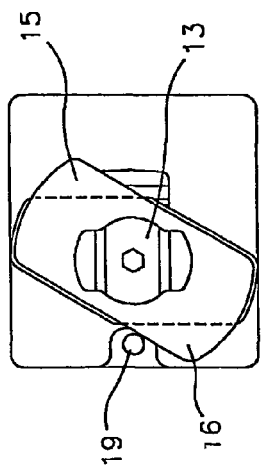
FIG. 8 is a bottom plan view of the latch device for cargo containers.
Figure 6:
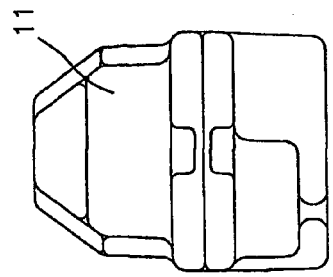
FIG. 6 is a back elevational view of the latch device for cargo containers.
Figure 16:
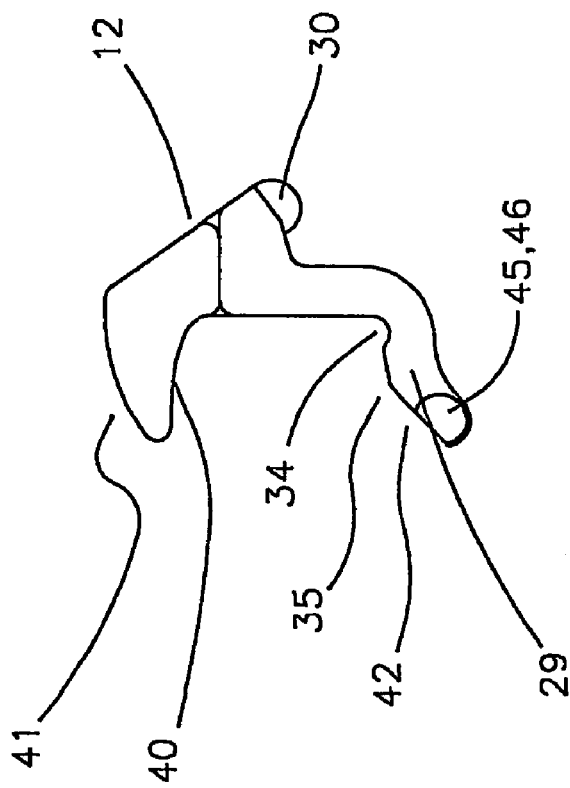
FIG. 16 is a side elevational view of the alternate latch for the latch device which contains two stub protrusions on the end of the leg of the latch.
Figure 15:
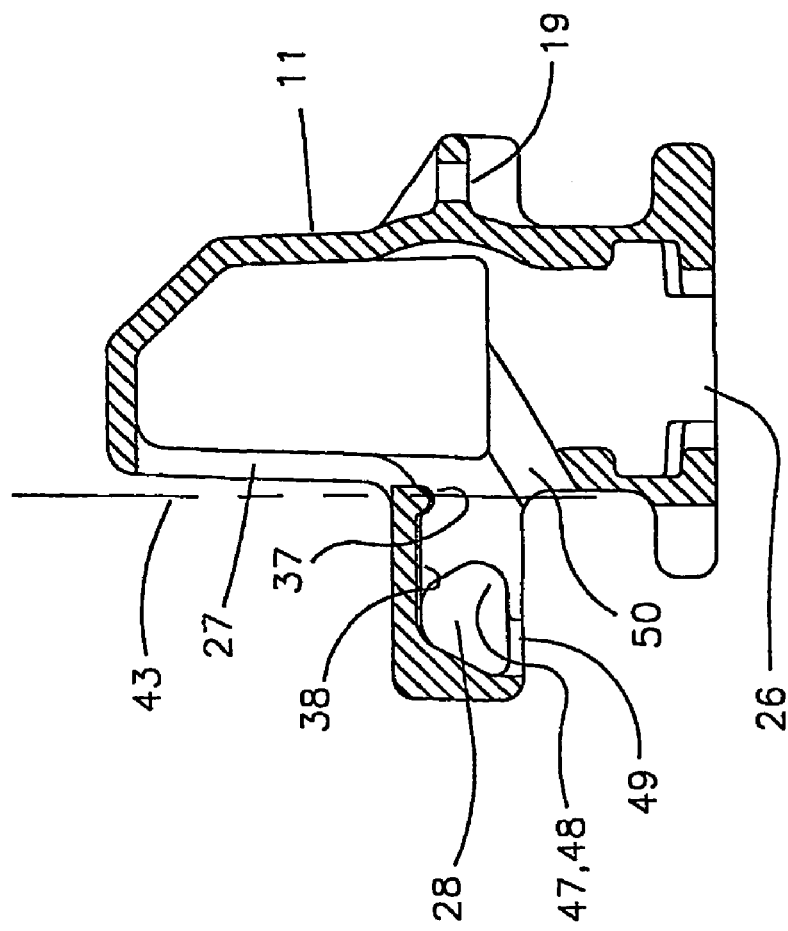
FIG. 15 is a sectional side elevational view of the housing far the latch device which utilizes an alternate latch that contains two stub protrusions on the end of the leg of the latch.
Figure 19:
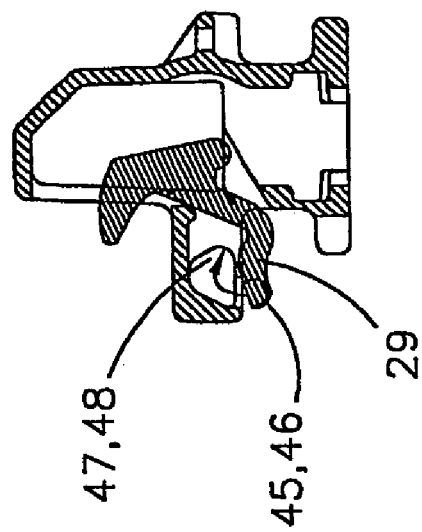
FIG. 19 is a sectional side elevational view of the housing for the latch device showing the final assembly path utilized for assembling the said alternate latch that contains two stub protrusions on the end of the leg, the two stub protrusions on the end of the leg are being inserted through the bottom cavity shown in FIG. 11.
Figure 18:
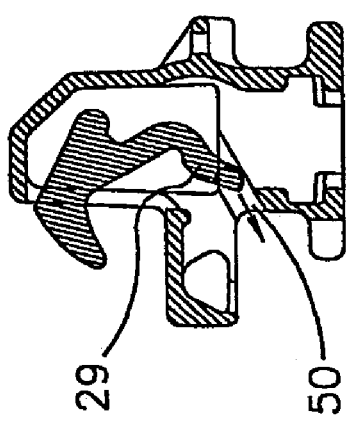
FIG. 18 is a sectional side elevational view of the housing for the latch device showing the secondary assembly path utilized for assembling the said alternate latch that contains two stub protrusions on the end of the leg, the two stub protrusions on the end of the leg are being inserted through the frontal cavity shown in FIG. 10.
Figure 17:
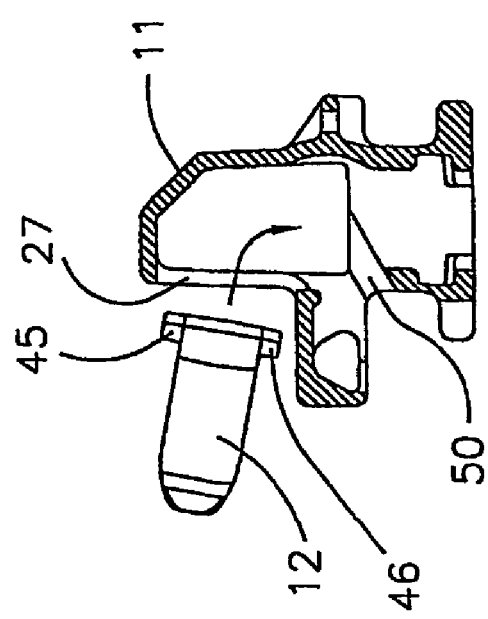
FIG. 17 is a sectional side elevational view of the housing for the latch device showing the initial insertion technique utilized for assembling the said alternate latch that contains two stub protrusions on the end of the leg.

The latch device 10 is comprised of housing 11, a latch 12, a retainer 13 and a spring 14. An exploded perspective view is shown in FIG. 2. An assembled side lateral view of device 10 is shown in FIG. 4. The housing has flanges 15 and 16 which extend outwardly from the housing which engage a cargo containers corner casting aperture opening 24 or a vehicle decks comparable aperture opening 23. The housing 11 has a base 18 which is spaced between two cargo containers corner fittings 21 or a cargo containers corner fittings 21 and a vehicle decks appropriate structure and surface 25.

Figure 39:
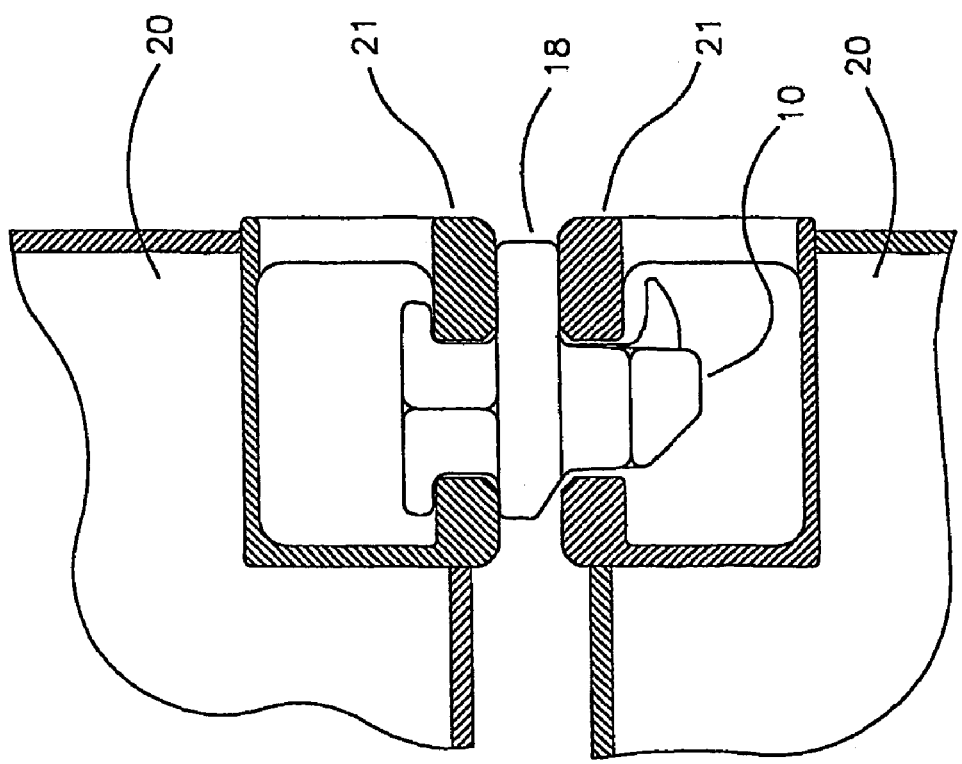
FIG. 39 is a lateral side elevational view of the latch device appropriately retained between two cargo containers.

The illustrations within this document shows that the vehicle decks appropriate structure and surface 25 is identical to the same aperture shape, size, and structure thickness of a standard cargo container corner casting. This is desirable so that the latch device 10 maybe utilized for orientating with latch 12 upwards as shown in FIG. 41 or downwards as shown in FIG. 39. It is to be noted that the scope of the design of latch device 10 is not to be limited to an appropriate structure and surface 25 being identical to a cargo containers corner fittings 21. Housing 11 and flanges 15 and 16 are allowed to be varied so as to engage an appropriate deck aperture that is defined by the user.

The illustration in FIG. 12 shows an example of the tailorability of housing 11 where instead of flanges 15 and 16, the bottom end of housing 11 may be formed into a round cylinder shape 52 which is capable of containing retainer 13 and spring 14. FIGS. 43 and 44 show a side and frontal view respectively of Device 10 securing a cargo container 20 to the vehicle decks appropriate structure 22. An appropriate surface 54 is to allow device 10 to be supported with proper provisions 53 for shape 52 of housing 11. FIGS. 43 and 44 show the example of how housing 11, if made of appropriate materials maybe fastened to surface 54 by welds 55.

There are two typical application uses for Latch Device 10. One application of latch device 10 is for securing standard cargo containers 20 (partial side sectional views shown) together by latching their corner castings 21, see FIGS. 39 and 40. The other typical application of latch device 10 is for securing a standard cargo container 20 onto a vehicle deck or frame 22 such as shown in FIGS. 41, 42, 43 and 44.

Figure 22:
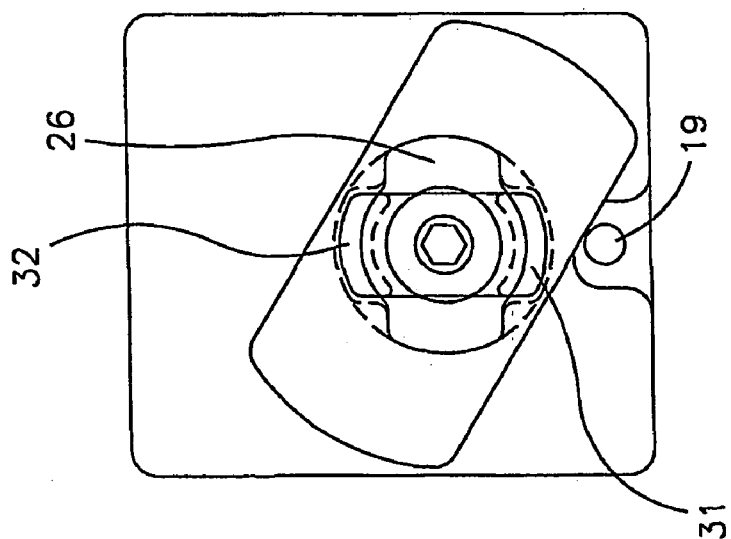
FIG. 22 is a bottom plan view of the latch device showing the end of a spring in the housings slot cavity and the retainer turned and secured to captivate the internal spring and latch appropriately.
Figure 21:
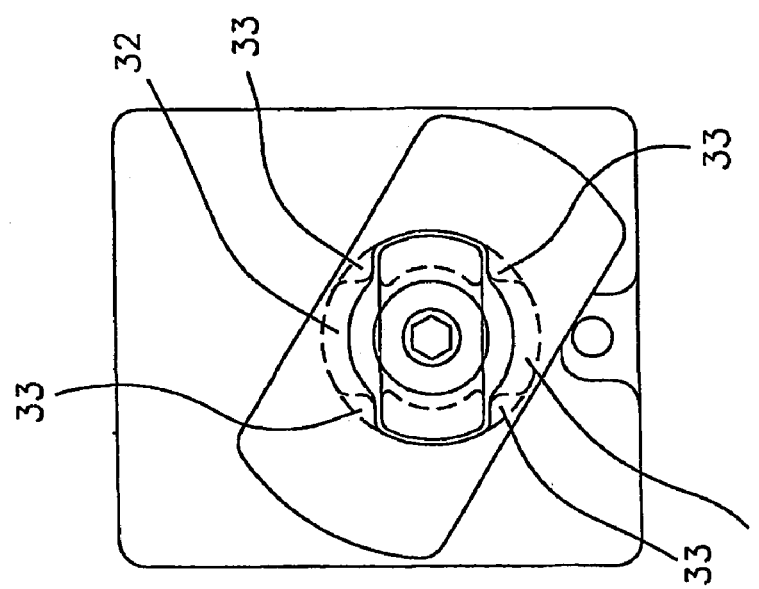
FIG. 21 is a bottom plan view of the latch device showing the end of a spring in the housings slot cavity and the retainer placed on top of the spring appropriately.
Figure 20:
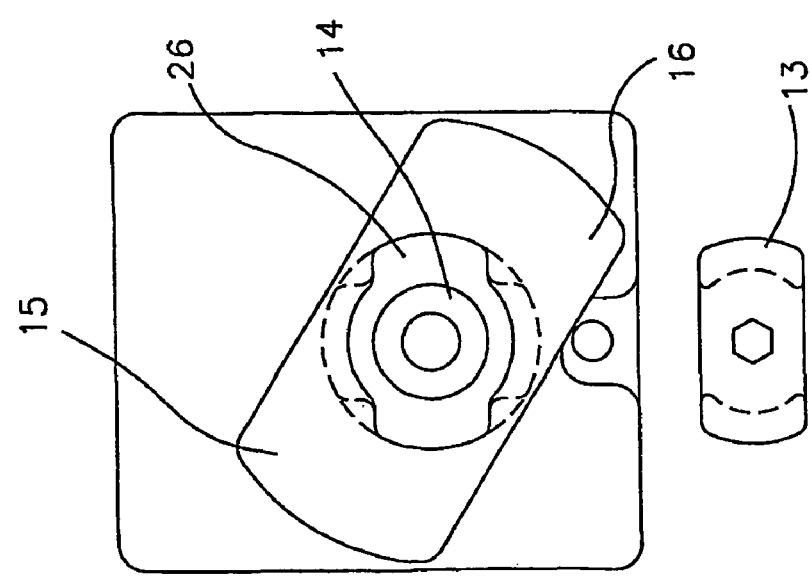
FIG. 20 is a bottom plan view of the latch device showing the end of a spring in the housings slot cavity and a view of the appropriate retainer.
Figures 28, 29, 30, 31, 32:
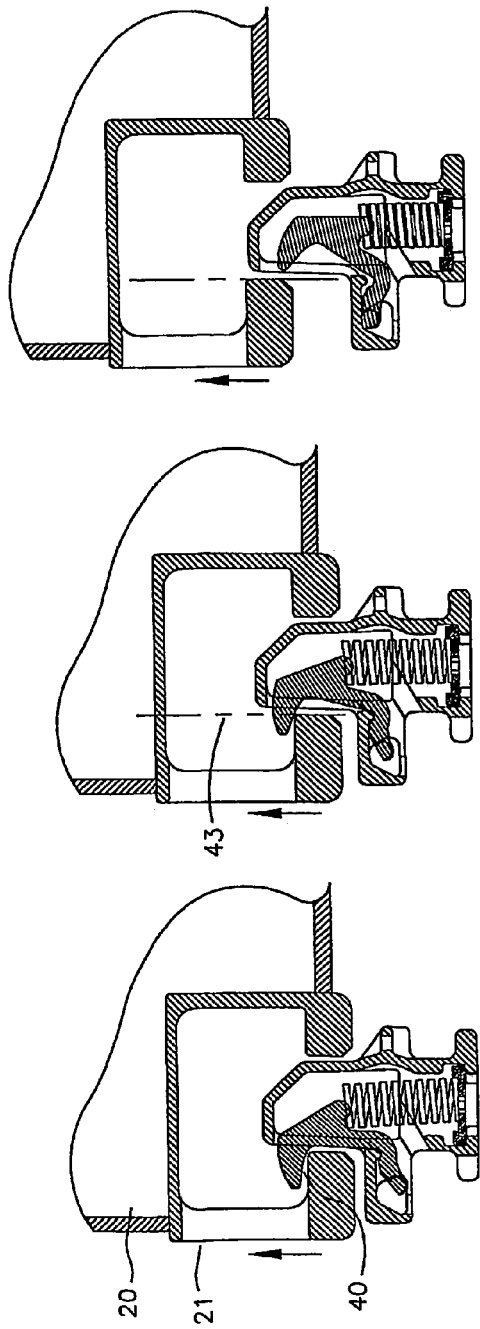
FIG. 28 is a sectional side elevational view showing the positions of the latch devices internal components that include the alternate latch that contains two stub protrusions on the end of the leg, just prior to the cargo containers corner fitting being removed from the device.
FIG. 29 is a sectional side elevational view showing the positions of the latch devices internal components that include the alternate latch that contains two stub protrusions on the end of the leg, during partial removal of the cargo containers corner fitting from the device.
FIG. 30 is a sectional side elevational view showing the positions of the latch devices internal components that include the alternate latch that contains two stub protrusions on the end of the leg, retracted into the devices housing just after the cargo containers corner fitting has been removed from the device.
FIG. 31 is a sectional side elevational view showing the positions of the latch devices internal components that include the alternate latch that contains two stub protrusions on the end of the leg, just prior to the cargo containers corner fitting engaging with the device.
FIG. 32 is a sectional side elevational view showing the positions of the latch devices internal components that include the alternate latch that contains two stub protrusions on the end of the leg, fully retracted into the devices housing just after the cargo containers corner fitting has been engaged onto the device.

One unique feature of the latch device 10 is how the device is assembled and its components housing 11, latch 12, retainer 13 and spring 14 are held together in relation to each other. To assemble latch device 10, refer to FIG. 26. Leg 29 of latch 12 is first inserted into cavity opening 27 of housing 11 and then positioned into the internal pocket 28 as shown in FIG. 26. Secondly, spring 14 which is a typical metal compression or die spring is inserted through cavity opening 26 of housing 11 with one end on the spring being positioned onto the protrusion 30 of latch 12. FIG. 20 is a bottom plan view of latch device 10 showing the end of a spring 12 in the housing cavity opening 26 and a view of the appropriate retainer 13. Retainer 13 is orientated and placed into housing cavity opening 26 on top of the end of spring 12 as shown in FIG. 21. An appropriate assembly force is applied to retainer 13 compressing spring 12 so as to push retainer 13 into housing cavity opening 26 past tabs 31 and 32 and four internal nubs 33. Retainer 13 is then rotated appropriately as shown in FIG. 22 and become aligned with tabs 31 and 32 and the four internal nubs. The assembly force that has been applied to retainer 13 is removed and this results in retainer 13 backing out of the housing cavity 26 and bearing against tabs 31 and 32 which prevents complete removal of retainer 13. The four internal nubs 33 traps the retainer 13 into the desired position holding the parts together and prevents retainer 13 from rotating and inadvertently aligning itself with housing cavity 26 which would allow the parts to come loose. To disassemble latch device 10, the order of these steps are reversed.

Another unique feature of the latch device 10 is that it has an integral attachment feature 19. This feature allows an appropriate tether, such as a chain or cable, to be attached to housing 11 which in turn secures latch device 10 to a deck 22 or frame of a vehicle. Attachment feature 19 is typically a through hole and is not unique by itself, but the uniqueness is that this feature is integral with this type of devices housing 11 and has not been represented by any known prior art. The reason for this type of integral attachment feature is to deter theft of latch device 10 when it is desired for it to be removed from an appropriate structure and surface 25 from a vehicle deck 22 but yet remain with the vehicle. Latch device 10 is to be capable of being removed from the appropriate structure and surface 25 and stowed in an appropriate area on the vehicle so the latch device 10 will not be in the way for other types of lading when cargo containers are not being transported.

Another unique and novel feature of latch device 10 is that there is no pin, bolt or fastener retaining latch 12 to housing 11. All prior art that utilizes a pivoting latch uses some type of latch/pin arrangement. Latch device 10 utilizes a latch 12 that is contoured and functionally matched to fit within the internal contours of housing 11 and be restrained by the resulting geometry. FIGS. 23 through 27 show sectional views of latch device 10 at various operational stages of engaging and disengaging with a corner casting 21 of a standard cargo container 20. FIGS. 28 through 32 show sectional views of latch device 10 at various operational stages of engaging and disengaging with a corner casting 21 of a standard cargo container 20, this device 10 utilizes an alternate latch 12 shape that has stub protrusions 45 and 46 on the end of leg 29 (see FIG. 2).

FIG. 23 represents the earliest operational stage of when a corner casting 21 of a standard cargo container 20 is being removed off of the latch device 10 and is starting to make contact with the concave underside 40 of latch 12. It is to be observed that latch 12 is secured in the internal pocket 28 of housing 11 by its leg 29. Latch surfaces 34 and 36 contact internal housing pocket 28 at surfaces 37 and 39 respectively. Spring 14 being positioned onto the protrusion 30 of latch 12 assures that latch 12 is secured into proper position. As corner casting 21 of a standard cargo container 20 is being removed off of the latch device 10 and is in contact with the concave underside 40 of latch 12. It is to be observed that latch 12 is pivoting in the internal pocket 28 of housing 11 by its Leg 29. Latch surface 34 is contacting and pivoting about internal housing pocket 28 at surface 37. Spring 14 being positioned onto the protrusion 30 of latch 12 assures that latch 12 translates and pivots through the desired motion. The actual location and shape of latch surface 34 and internal housing surface 37 is allowed to be tailored as desired to obtain the desired release action of the latch device 10.

FIG. 24 represents the operational stage of when a corner casting 21 of a standard cargo container 20 is being removed off of the latch device 10 and is making contact with the concave underside 40 of latch 12. It is to be observed that latch 12 has pivoted and rotated in the internal pocket 28 of housing 11 by its Leg 29. FIG. 24 shows that latch surface 35 is now coming into contact and pivoting about internal housing pocket 28 at surface 39. Spring 14 being positioned onto the protrusion 30 of latch 12 assures that latch 12 translates and pivots through the desired motion. The actual location and shape of latch surfaces 34 and 35 and internal housing surfaces 37 and 38 is allowed to be tailored as desired to obtain the desired release action of the latch device 10.

It is to be observed that this two or more surface pivot and contact areas of latch 12 during the release action of latch device 10 is similar but unique from prior art Brewster U.S. Pat. No. 5,570,981. Latch 12 of latch device 10 is not guided and restrained by a pin. Line action 43 defines the travel line which the contact surfaces of corner casting 21 of a standard cargo container 20 travels while it is being removed off of or being placed onto the latch device 10. Typically it is desired that latch surface 34 contacting and pivoting about internal housing pocket 28 at surface 37 is near or to the right of line action 43 which results in minimizing the mechanical force advantage of spring 14. Minimizing the mechanical force advantage of spring 14 during initial release motion of corner casting 21 aids in obtaining low applied forces and smooth startup motion of latch 12. After startup motion of latch 12, it is desired to increase the mechanical force advantage of spring 14 so as to minimize the required size of spring 14. This is accomplished by creating new pivot areas other than surface 34 of latch 12 farther away and to the left of line action 43 as illustrated in FIG. 24 and previously described.

FIG. 25 represents the operational stage further along when a corner casting 21 of a standard cargo container 20 is being removed off of the latch device 10 and clears contact with the concave underside 40 of latch 12. It is to be observed that latch 12 is pivoting in the internal pocket 28 of housing 11 by its leg 29. FIG. 25 shows latch surface 35 is contacting and pivoting about internal housing pocket 28 at surface 38. It is allowed for latch surface 42 to be contoured and to contact and pivot about internal housing pocket 28 at surface 38 to obtain the desired release effect of latch device 10. Spring 14 being positioned onto the protrusion 30 of latch 12 assures that latch 12 translates and pivots through the desired motion. The actual location and shape of latch surfaces 34, 35 and 42 and internal housing surfaces 37 and 38 are allowed to be tailored as desired to obtain the desired release action of the latch device 10.

FIG. 26 represents the earliest operational stage of when a corner casting 21 of a standard cargo container 20 is engaging with latch device 10 and is starting to make contact with the convex upper-side 41 of latch 12. It is to be observed that latch 12 is secured in the internal pocket 28 of housing 11 by its Leg 29. Latch surfaces 34 and 36 contact internal housing pocket 28 at surfaces 37 and 39 respectively. Spring 14 being positioned onto the protrusion 30 of latch 12 assures that latch 12 is secured into proper position. As corner casting 21 of a standard cargo container 20 is engaging the latch device 10 and is in contact with the convex upper-side 41 of latch 12. It is to be observed that latch 12 is pivoting in the internal pocket 28 of housing 11 by its Leg 29. Latch surface 36 is contacting and pivoting about internal housing pocket 28 at surface 39. Spring 14 being positioned onto the protrusion 30 of latch 12 assures that latch 12 translates and pivots through the desired motion. The actual location and shape of latch surface 36 and internal housing surface 39 is allowed to be tailored as desired to obtain the desired engagement action of the latch device 10.

It is to be observed that this pivot and contact area 36 of latch 12 during the engagement action of latch device 10 is similar but unique from prior art Brewster U.S. Pat. No. 5,570,981. Latch 12 of latch device 10 is not guided and restrained by a pin. Line action 43 defines the travel line which the contact surfaces of corner casting 21 of a standard cargo container 20 travels while it is engaging and being placed onto the latch device 10. Typically it is desired that latch surface 36 contacting and pivoting about internal housing pocket 28 at surface 39 be as far away and to the left of line action 43 which results in minimizing the mechanical force advantage of spring 14 as illustrated in FIG. 24. Minimizing the mechanical force advantage of spring 14 during the engagement motion of corner casting 21 aids in obtaining low applied forces and smooth engagement motion of latch 12.

FIG. 27 represents the operational stage further along when a corner casting 21 of a standard cargo container 20 is being engaged onto latch device 10 and clears contact with the convex upper-side 41 of latch 12. It is to be observed that latch 12 is pivoting in the internal pocket 28 of housing 11 by its leg 29. FIG. 27 shows latch surface 36 is contacting and pivoting about internal housing pocket 28 at surface 39. Spring 14 being positioned onto the protrusion 30 of latch 12 assures that latch 12 translates and pivots through the desired motion. The actual location and shape of latch surface 36 and internal housing surface 39 is allowed to be tailored as desired to obtain the desired release action of the latch device 10.

Figure 35:
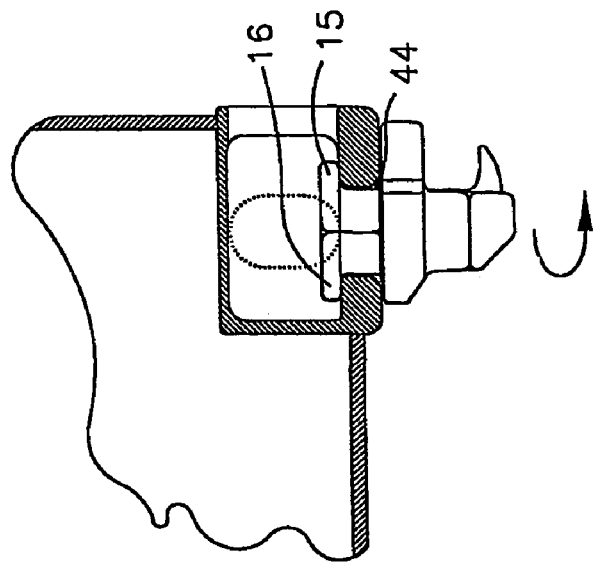
FIG. 35 is a lateral side elevational view of the latch device appropriately rotated so its bottom flanges are orientated to retain the latch device in a cargo container corner casting aperture.
Figure 34:
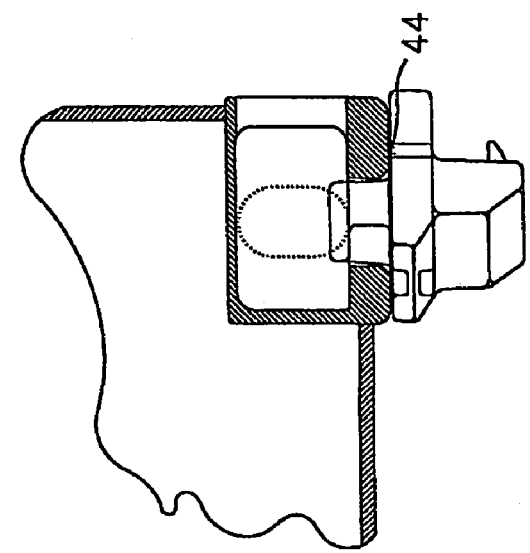
FIG. 34 is a lateral side elevational view of the latch device appropriately rotated so its bottom flanges are orientated with a cargo container corner casting aperture and raised up into the aperture.
Figure 33:
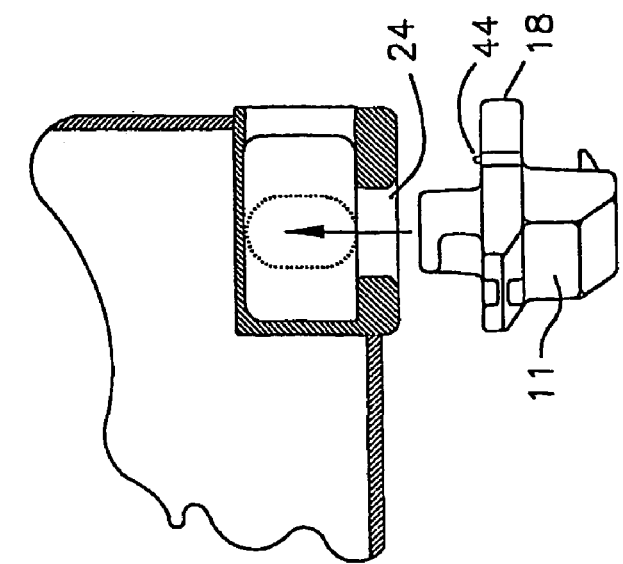
FIG. 33 is a lateral side elevational view of the latch device appropriately rotated so its bottom flanges are orientated with a cargo container corner casting aperture.
Figure 38:
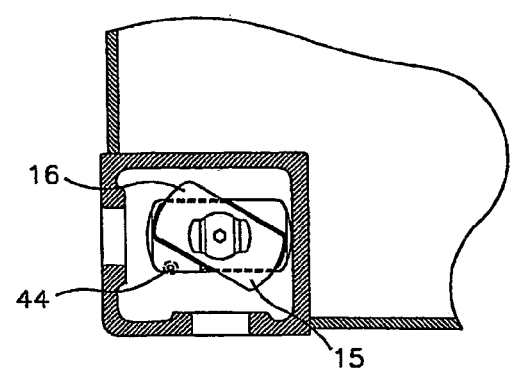
FIG. 38 is a sectional horizontal view of the cargo containers bottom corner casting shown in FIG. 20. The captivated flanged end of the latch device is clarified.
Figure 36:
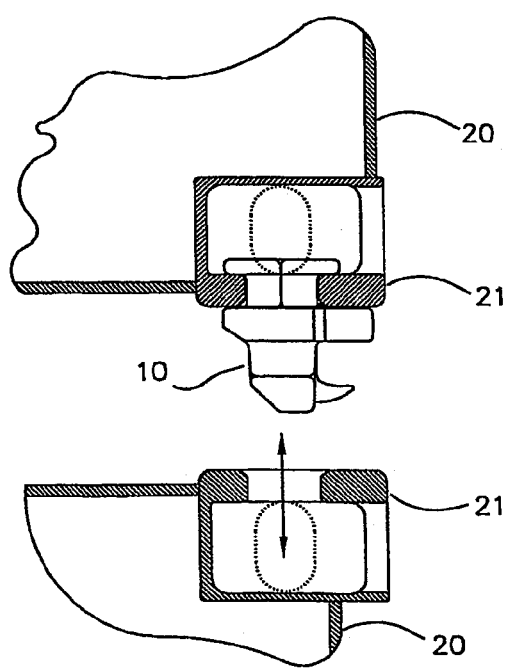
FIG. 36 is a lateral side elevational view of the latch device appropriately retained in a cargo containers bottom corner casting aligned and ready to be lowered down onto another cargo containers top corner casting.
Figure 37:
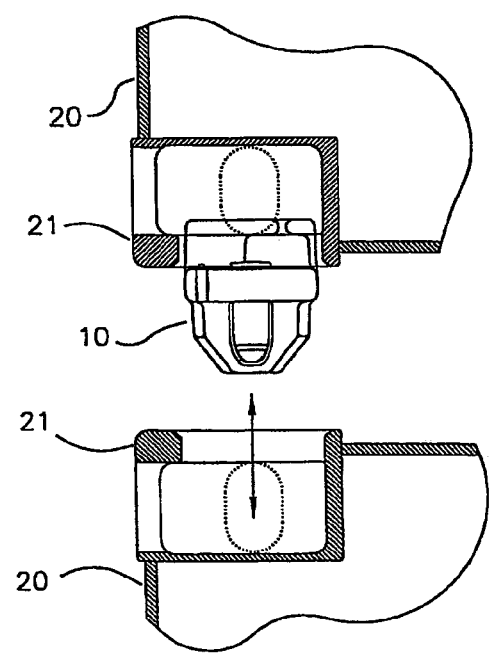
FIG. 37 is a longitudinal side elevational view of the latch device appropriately retained in a cargo containers bottom corner casting aligned and ready to be lowered down onto another cargo containers top corner casting.
Figure 40:
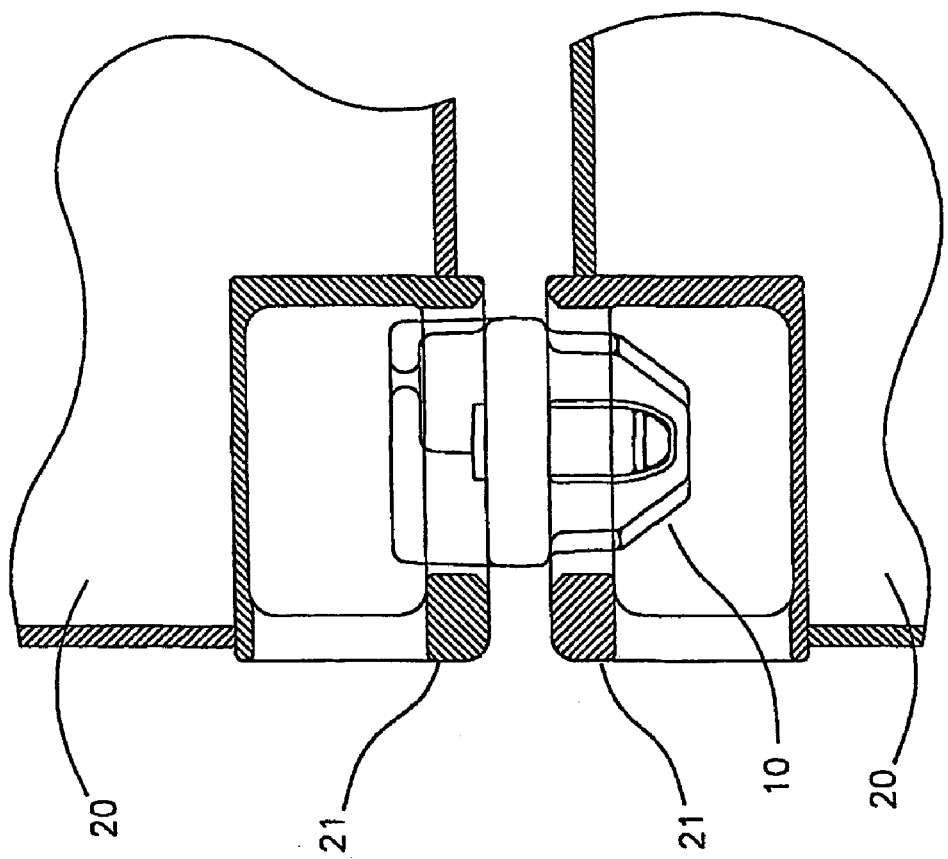
FIG. 40 is a longitudinal side elevational view of the latch device appropriately retained between two cargo containers.

An optional unique feature of the latch device 10 is that for double cargo container stacking it may be desirable to include the integral retractable plunger feature 44. FIG. 33 is a side elevational view of latch device 10 appropriately rotated so its bottom flanges 15 and 16 are orientated with a cargo container corner casting aperture 24. The integral retractable plunger feature 44 points out from base 18 of housing 11. As latch device 10 is raised into cargo container corner casting aperture 24 as shown in FIG. 34 the plunger feature 44 automatically retracts out of the way into the base 18 of housing 11. The latch device 10 is then rotated while in the cargo container corner casting aperture 24 as shown in FIG. 35 so flanges 15 and 16 prevent removal of latch device 10 from corner casting 21 of a standard cargo container 20. When latch device 10 has been rotated into the desired position the plunger feature 44 automatically raises out of base 18 of housing 11 into the open area of the cargo container corner casting aperture 24. A horizontal sectional view of corner casting 21 of a standard cargo container 20 in FIG. 38 shows a planar view of plunger feature 44 in corner casting aperture 24. Latch device 10 is prevented from inadvertently coming loose and falling out of corner casting 21 while the standard cargo container 20 is being positioned during loading or unloading operations because the plunger feature 44 has been raised out of base 18 and into the open clear area in corner casting aperture 24. To remove latch device 10 from corner casting 21 one has to grasp the extending part of housing 11 of latch device 10 and manually rotate the latch device 10 about it's axis in such a manner to realign flanges 15 and 16 with corner casting aperture 24 as shown in FIG. 34. This rotation action results in plunger feature 44 to bear up against the cargo container corner casting aperture 24 cast surfaces and automatically retract back into base 18 of housing 11 no longer acting as a deterrent to removal of latch device 10. Latch device 10 may then be lowered down out of corner casting aperture 24 as shown in FIG. 33.

Latch device 10 plunger feature 44 performs a similar task as the prior art of the Safe-T-Loc manually operated feature described in the Peck & Hale-F665 Safe-T-Loc Stacker flyer. Plunger feature 44 is unique in that it performs its function automatically and is of an obviously different design.

Although the invention is described with respect to a preferred embodiment, modifications thereto will be apparent to those skilled in the art.

What is claimed is:

1. A cargo container hold down arrangement for cargo containers of generally a parallelepiped configuration and having an underside with four corners, wherein the four corners of the underside of the cargo containers are each equipped with a corner fitting for purposes of securing the cargo containers to a platform that is horizontally disposed, and with each of said corner fittings being disposed in co-planar relation and respectively each of said corner fittings defining a similar locking opening and a planar bearing surface that are respectively disposed adjacent said lockings openings of the respective corner fittings, with a container securement device for each of the respective corner fittings for securing the cargo container to the platform, said securement devices each comprising:

a shear block defining a front side, a top side, and a back side, with said shear block forming a base portion defining a planar force transmitting surfacing portion that extends to either side of the base portion, and a projecting portion that is generally normal to the planar bearing surface;

said shear block further defining an internal chamber that in the projecting portion of said shear block is open at said front side of the shear block;

said shear block base portion also defining a second force transmitting surfacing portion for engagement with the platform, and including a latch member pivotally mounted, but unpinned, in said internal chamber, for movement therein in a plane that is normally disposed relative to said front and back sides of said shear block, and that is about a pivot axis that is normal to such plane;

said latch member including a nose portion having an upper cam surfacing means for engagement by the bearing surface of a correspondingly located one of said container mounted fittings, and an under cam surfacing means for engagement by the planar bearing surface of such correspondingly located one of said container mounted fittings for removal of one of said cargo containers from the platform;

resilient means for biasing said latch member to dispose said nose portion thereof exteriorly of said shear block opening in said front side thereof when said cam surfacing means are not in use, said resilient means having, a resilient member interposed between said latch member and said base portion opposite a tail portion of the latch member;

means for effecting deflection of said latch member about said pivot axis to within the shear block on engagement of one of the cargo containers being lowered with said latch member nose portion upper cam surfacing means, and means for effecting deflection of said latch member within the shear block on engagement of a correspondingly located one of said container corner fittings of one of the cargo containers being removed from the platform and about a separate axis spaced frontwise from and parallel to said pivot axis of said latch member, said separate axis is disposed adjacent a level the second force transmitting surfacing portion of the shear block.

2. The cargo container hold down arrangement set forth in claim 1, wherein the top and back sides of said shear block are imperforate.

3. A container securement device for use with the corner fittings of a lower side of a cargo container of parallelepiped configuration for securing the cargo container to a platform, said securement device comprising:
   a shear block defining a front side, a top side, and a back side;
   said shear block forming a base portion defining a planar force transmitting surfacing portion that extends to either side of the base portion, and a projecting portion that is generally normal to the planar surfacing portion;
   said shear block further defining an internal chamber that in the projecting portion of said shear block is open at said front side of the shear block;
   said shear block base portion also defining a second force transmitting surfacing portion for engagement with said platform, and including a latch member pivotally, but unpinned, mounted in said chamber, for movement therein in a plane that is normally disposed relative to said front and back sides of said shear block, and that is about a pivot axis that is normal of such plane;
   said latch member including a nose portion having an upper cam surface;
   said upper cam surface engaging a first bearing surfacing of one of said container mounted fittings,
   said latch menber also including an under cam surface;
   said under cam surface engaging a second bearing surfacing of such correspondingly located container mounting fitting for removal of such container from such platform;
   a resilient member biasing said latch member to dispose said nose portion thereof exteriorly of said shear block opening in said front side thereof when said cam surfaces are not in use;
   said resilient member being interposed between said latch member and said base portion apposite a tail portion of the latch member;
   a first deflector associated with said resilient member;
   said first deflector moving said latch member about said pivot axis to within the shear block on engagement of the cargo container being lowered with said latch member nose portion upper cam surface;
   a second deflector associated with said resilient member;
   said second deflector moving said latch member within the shear block on engagement of a correspondingly located one of said container corner fittings of the cargo container being removed from such platform and about a separate axis spaced from and parallel to said pivot axis of said latch member.

* * * * *

UNITED STATES PATENT AND TRADEMARK OFFICE
CERTIFICATE OF CORRECTION

PATENT NO. : 7,114,898 B2
APPLICATION NO. : 10/415394
DATED : October 3, 2006
INVENTOR(S) : John B. Brewster It is certified that error appears in the above-identified patent and that said Letters Patent is hereby corrected as shown below:

On the patent title page, (60), Related U.S. Application Data should read as follows:
--Provisional application No. 60/292,505, filed on May 21, 2001, provisional application No. 60/245,965, filed on Nov. 2, 2000.--

In Column 1, line 7, the paragraph should be corrected as follows:
--This is a non-provisional application claiming priority based on App. No. 60/245,965, filed on Nov. 2, 2000 and entitled "Latch Device for Securing Cargo Containers Together And/or to Vehicle Decks," and also claiming priority based on App. No. 60/292,505, filed on May 21, 2001 also entitled "Latch Device for Securing Cargo Containers Together And/or to Vehicle Decks."--

Signed and Sealed this

Eighteenth Day of December, 2007

JON W. DUDAS
*Director of the United States Patent and Trademark Office*